US010678878B2

(12) United States Patent
Li et al.

(10) Patent No.: US 10,678,878 B2
(45) Date of Patent: Jun. 9, 2020

(54) METHOD, DEVICE AND STORING MEDIUM FOR SEARCHING

(71) Applicant: TENCENT TECHNOLOGY (SHENZHEN) COMPANY LIMITED, Shenzhen (CN)

(72) Inventors: Xi-Zhi Li, Shenzhen (CN); Hui Hao, Shenzhen (CN)

(73) Assignee: TENCENT TECHNOLOGY (SHENZHEN) COMPANY LIMITED, Guangdong (CN)

(*) Notice: Subject to any disclaimer, the term of this patent is extended or adjusted under 35 U.S.C. 154(b) by 788 days.

(21) Appl. No.: 14/451,517

(22) Filed: Aug. 5, 2014

(65) Prior Publication Data
US 2014/0344239 A1 Nov. 20, 2014

Related U.S. Application Data

(63) Continuation of application No. PCT/CN2014/076786, filed on May 5, 2014.

(30) Foreign Application Priority Data

May 20, 2013 (CN) .......................... 2013 1 0188179

(51) Int. Cl.
G06F 16/00 (2019.01)
G06F 16/954 (2019.01)
(Continued)

(52) U.S. Cl.
CPC .......... G06F 16/954 (2019.01); G06F 16/906 (2019.01); G06F 16/90328 (2019.01);
(Continued)

(58) Field of Classification Search
CPC ..................... G06F 17/30864; G06F 17/30973
(Continued)

(56) References Cited

U.S. PATENT DOCUMENTS 7,765,227 B1* 7/2010 Khoshnevisan .... G06F 16/9535
707/769
8,019,749 B2* 9/2011 Leban ................. G06F 16/9038
707/713
(Continued)

FOREIGN PATENT DOCUMENTS

CN 101216830 7/2008
CN 101470741 7/2009
(Continued)

OTHER PUBLICATIONS

WIPO Patent Cooperation Treaty (PCT), "International Search Report," PCT/CN2014/076786, dated Jul. 30, 2014.
(Continued)

Primary Examiner — Diedra McQuitery
(74) Attorney, Agent, or Firm — Sughrue Mion, PLLC

(57) ABSTRACT

The present disclosure relates to a method and device for searching. The method includes: receiving a search condition from a client; extracting a search category from the search condition; determining whether the search condition comprising conditioning property values selected by users; if the search condition comprising the conditioning property values, obtaining property items corresponding to each of the conditioning property values; conditioning clustering the property values one by one, wherein the conditioning clustering comprises obtaining an object clustering result set corresponding to each property value by using the search categories and all conditioning property values whose property value and the property value to be clustered belong to different property items as a prerequisite clustering condition; and if the object clustering result set not being an empty set, returning the object clustering result set to the client. The method and device of present disclosure has improved search efficiency.

5 Claims, 12 Drawing Sheets

(51) Int. Cl.
  *G06F 16/951* (2019.01)
  *G06F 16/9032* (2019.01)
  *G06F 16/953* (2019.01)
  *G06F 16/9532* (2019.01)
  *G06F 16/906* (2019.01)

(52) U.S. Cl.
  CPC .......... *G06F 16/951* (2019.01); *G06F 16/953* (2019.01); *G06F 16/9532* (2019.01)

(58) Field of Classification Search
  USPC ........................................................ 707/706
  See application file for complete search history.

(56) References Cited

U.S. PATENT DOCUMENTS

| | | | | |
|---|---|---|---|---|
| 8,620,891 B1* | 12/2013 | Thirumalai | ......... | G06F 16/9535 707/705 |
| 8,660,912 B1* | 2/2014 | Dandekar | .............. | G06Q 30/06 705/26.1 |
| 8,713,064 B1* | 4/2014 | Khafizov | ............ | G06F 16/9038 707/797 |
| 8,850,362 B1* | 9/2014 | Khoshnevisan | ...... | G06F 16/951 715/853 |
| 2003/0217052 A1* | 11/2003 | Rubenczyk | ......... | G06F 16/3323 |
| 2006/0095345 A1* | 5/2006 | Ka | .................... | G06Q 30/0603 705/26.62 |
| 2011/0016125 A1* | 1/2011 | Kang | ...................... | G06F 16/90 707/737 |
| 2012/0047045 A1* | 2/2012 | Gopikrishna | .......... | G06Q 10/10 705/26.5 |
| 2012/0265787 A1* | 10/2012 | Hsu | ..................... | G06F 16/3322 707/780 |
| 2013/0110628 A1 | 5/2013 | Yeo et al. | | |
| 2013/0325630 A1* | 12/2013 | Mendenhall | ....... | G06Q 30/0269 705/14.66 |

FOREIGN PATENT DOCUMENTS

| | | |
|---|---|---|
| CN | 102193936 | 9/2011 |
| CN | 102236850 | 11/2011 |
| CN | 102419779 | 4/2012 |
| CN | 102591972 | 7/2012 |
| JP | 2010205072 | 9/2010 |

OTHER PUBLICATIONS

State Intellectual Property Office (SIPO) of the P.R.C., "Office Action", dated Feb. 25, 2015, English translation of relevant part on p. 6.

* cited by examiner

METHOD, DEVICE AND STORING MEDIUM FOR SEARCHING

CROSS-REFERENCE

The application is a U.S. continuation application under 35 U.S.C. § 111 claiming priority under 35 U.S.C. §§ 120 and 365 to International Application No. Application No. PCT/CN2014/076786 filed on May. 5, 2014, which claims the priority benefit of CN patent application serial No. CN201310188179.3, titled "method and device for searching" and filed on May 20, 2013, the contents of which are incorporated by reference herein in their entirety for all intended purposes.

TECHNICAL FIELD

The present disclosure relates to computer field, and more particularly to a method and a device for search.

BACKGROUND

Shopping search engine usually supplies links of property values, such as "brand", "style", "color" and so on, for users to chose after a keyword searching or when users are browsing categories, such as "jacket", "bag", and so on. There are generally two options.

Option One

In some search engines, after users selecting a property value, the property item corresponding to the selected property value will be hidden. Users have to cancel the selection operation on the selected property value. Otherwise, it will not switch to other property values of the property item, which brings redundant operations when browsing.

Please refer to FIGS. 1-3. In FIG. 1, a classification list obtained by a keyword "coat" input by users includes property items such as "brand", "hot", "style", "recommended shops", and "color", etc., and each property item includes many property values for users to choose. It is assumed that users want to see the goods having the property value of "Seven Wolves" in the property item "brand".

In FIG. 2, when users click the property value of "Seven Wolves" in the property item of "brand", the property item of "brand" is entirely hidden. Therefore, unless the selected state of the property value of "Seven Wolves" is cleared, it is unlikely to return to the state shown in FIG. 1 to select other property values in the property item of "brand".

In FIG. 3, when users select property value of "Japanese and Korean personality" in the property item of "style" based on the condition shown in FIG. 2, the property item of "style" will be hidden. This means that if users want to switch the present property value to the property value of "British personality" in the property item of "style", it is needed to re-move the present choice of "Japan Korea personality".

It is obvious that the option one guarantees the accuracy of the displayed property value, but can not provide the function of switching to different property values in the same property item directly, which makes that when browsing products of other property values in the same property item, users have to clear the selected state of the original property value, a PV (Page View) is wasted, and the search efficiency is reduced.

Option Two

In some other search engines, it is allowed to switch between different property values in the same property item, however, it is unable to determine whether the search results of combined property values exist.

Please refer to FIGS. 4-6. In FIG. 4, a classification list obtained by a keyword "mobile phone" input by users includes "brand", "operating system", "contract plan", "screen size" and other property items, and each property item includes many property values for users to choose. It is assumed that users want to see the product with the property value of "Nokia" in the property item of "brand" and the property value of "Symbian" the property item of "operating system".

In FIG. 5, when users click the property value of "Nokia" and the property value of "Symbian", the search page will show the product icon meeting the search requirement. At this time, the property item of "brand" and the property item of "operating system" are not hidden, and each property item still displays multiple property values for choosing.

In FIG. 6, when users click property value of "iOS Apple" in the property item of "operating system", there is no search result for the combination of the property value of "Nokia" and the property value of "iOS Apple".

Thus, the option two allows switching between different property values in the same property item, which has a certain convenience, but cannot effectively determine whether there is any search result. The invalid search will waste a PV, which cannot improve search efficiency effectively either.

In summary, there is a problem of low search efficiency in the existing shopping search engines.

SUMMARY OF THE INVENTION

The present disclosure is to solve the problem of low search efficiency in the existing shopping search engine, thereby providing a method and device for searching.

Technical solutions provided by embodiments of the present disclosure include:

A method for searching includes: receiving a search condition from a client; extracting a search category from the search condition; determining whether the search condition comprising conditioning property values selected by users; if the search condition comprising the conditioning property values, obtaining property items corresponding to each of the conditioning property values; conditioning clustering the property values one by one, wherein the conditioning clustering comprises obtaining an object clustering result set corresponding to each property value by using the search categories and all conditioning property values whose property value and the property value to be clustered belong to different property items as a prerequisite clustering condition; and if the object clustering result set not being an empty set, returning the object clustering result set to the client.

A device for searching is also provided. The device includes: at least a processor operating in conjunction with a memory and a plurality of modules. The plurality of modules include: a receiving module, configured to receive a search condition sent from a client; an extracting module, configured to extract a search category from the search condition; a determining module, configured to determine whether the search condition comprising conditioning property values selected by users; a property item determination module, when the search condition comprising the conditioning property value, configured to obtain property items corresponding to each of the conditioning property values; a first clustering module, configured to conditioning cluster the property values one by one, wherein the conditioning clustering comprises obtaining an object clustering result set corresponding to each property value by using the search categories and all conditioning property values whose property value and the property value to be clustered belong to different property items as a prerequisite clustering condition; and a feedback module, if the object clustering result set not being an empty set, configured to return the object clustering result set to the client.

A non-transitory computer-readable storage storing instructions for search in a server is also provided. The instructions include: receiving a search condition from a client; extracting a search category from the search condition; determining whether the search condition comprising conditioning property values selected by users; if the search condition comprising the conditioning property values, obtaining property items corresponding to each of the conditioning property values; conditioning clustering the property values one by one, wherein the conditioning clustering comprises obtaining an object clustering result set corresponding to each property value by using the search categories and all conditioning property values whose property value and the property value to be clustered belong to different property items as a prerequisite clustering condition; and if the object clustering result set not being an empty set, returning the object clustering result set to the client.

In accordance with the method and device for searching, the present disclosure does real-time complete clustering on the property value that the target to be searched locates. Therefore it can switch between different property values in the same property item directly, and the search result will not be empty, and the search efficiency is improved.

Other features and advantages of the present disclosure will immediately be recognized by persons of ordinary skill in the art with reference to the attached drawings and detailed description of exemplary embodiments as given below.

BRIEF DESCRIPTION OF THE DRAWINGS

Figures 1, 2:
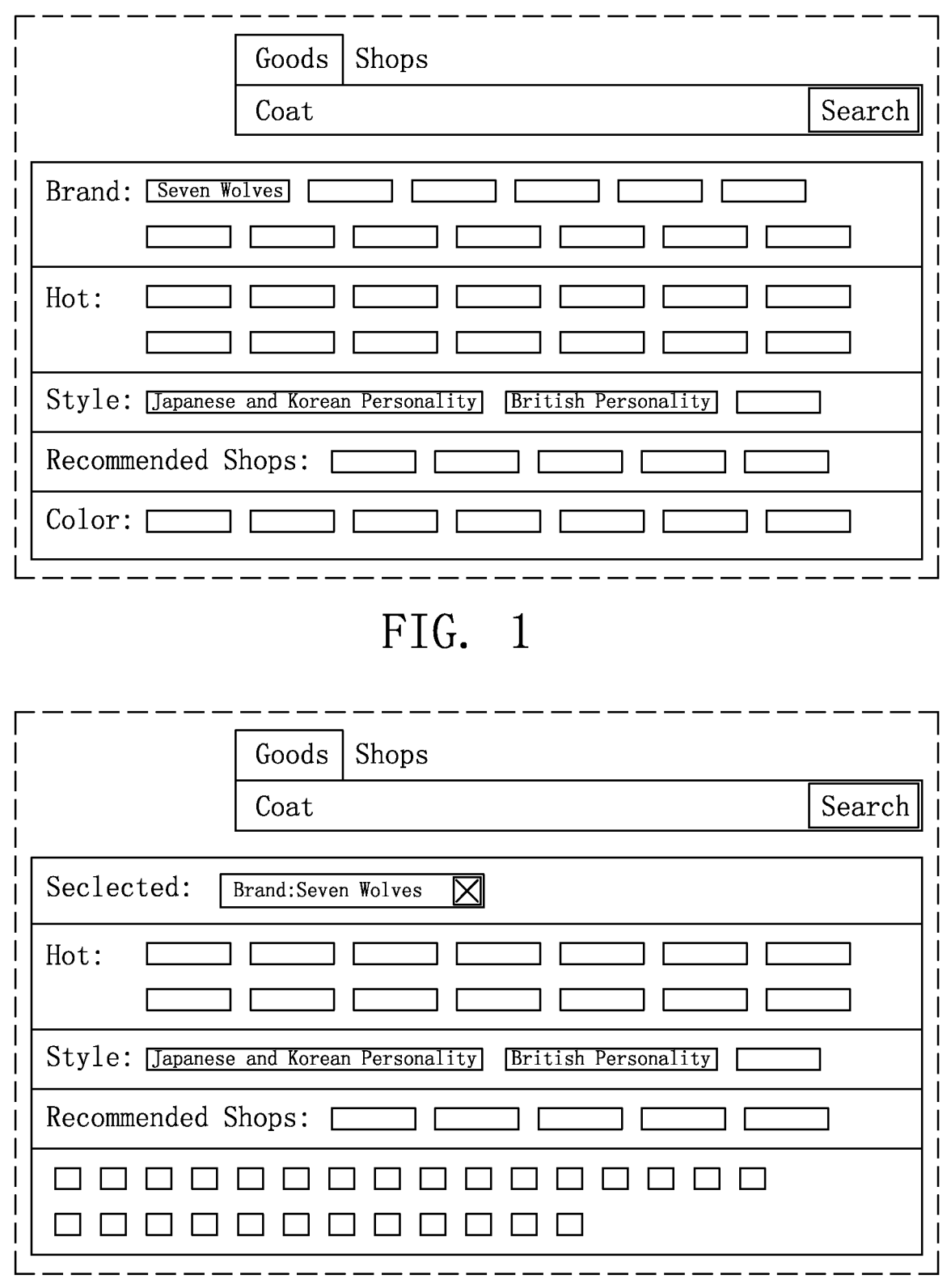

FIG. 1 is an illustration of one search process of the option one in the prior art.

FIG. 2 is an illustration of another search process of the option one in the prior art.

Figures 3, 4:
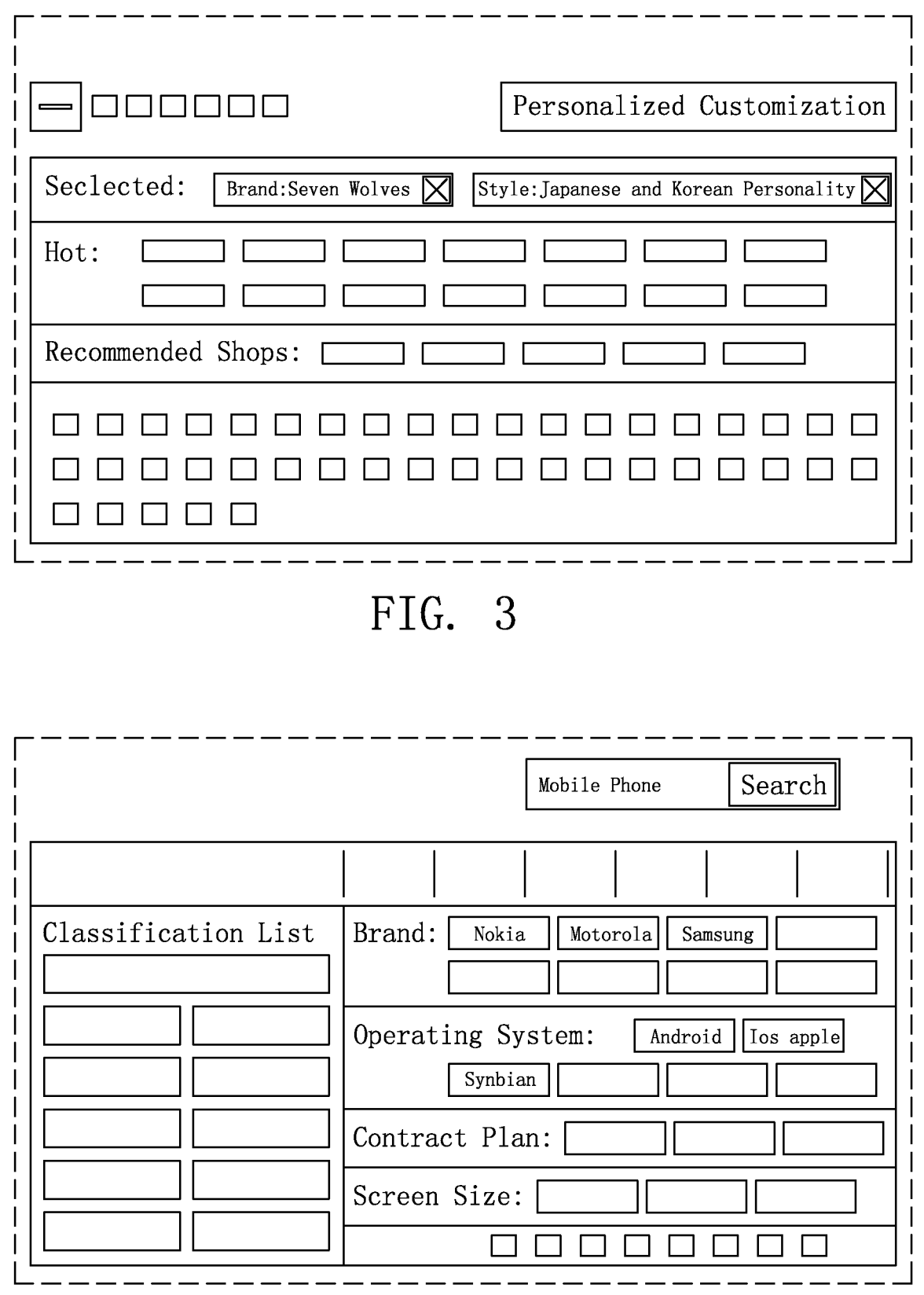

FIG. 3 is an illustration of yet another search process of the option one in the prior art.

FIG. 4 is an illustration of one search process of the option two in the prior art.

Figures 5, 6:
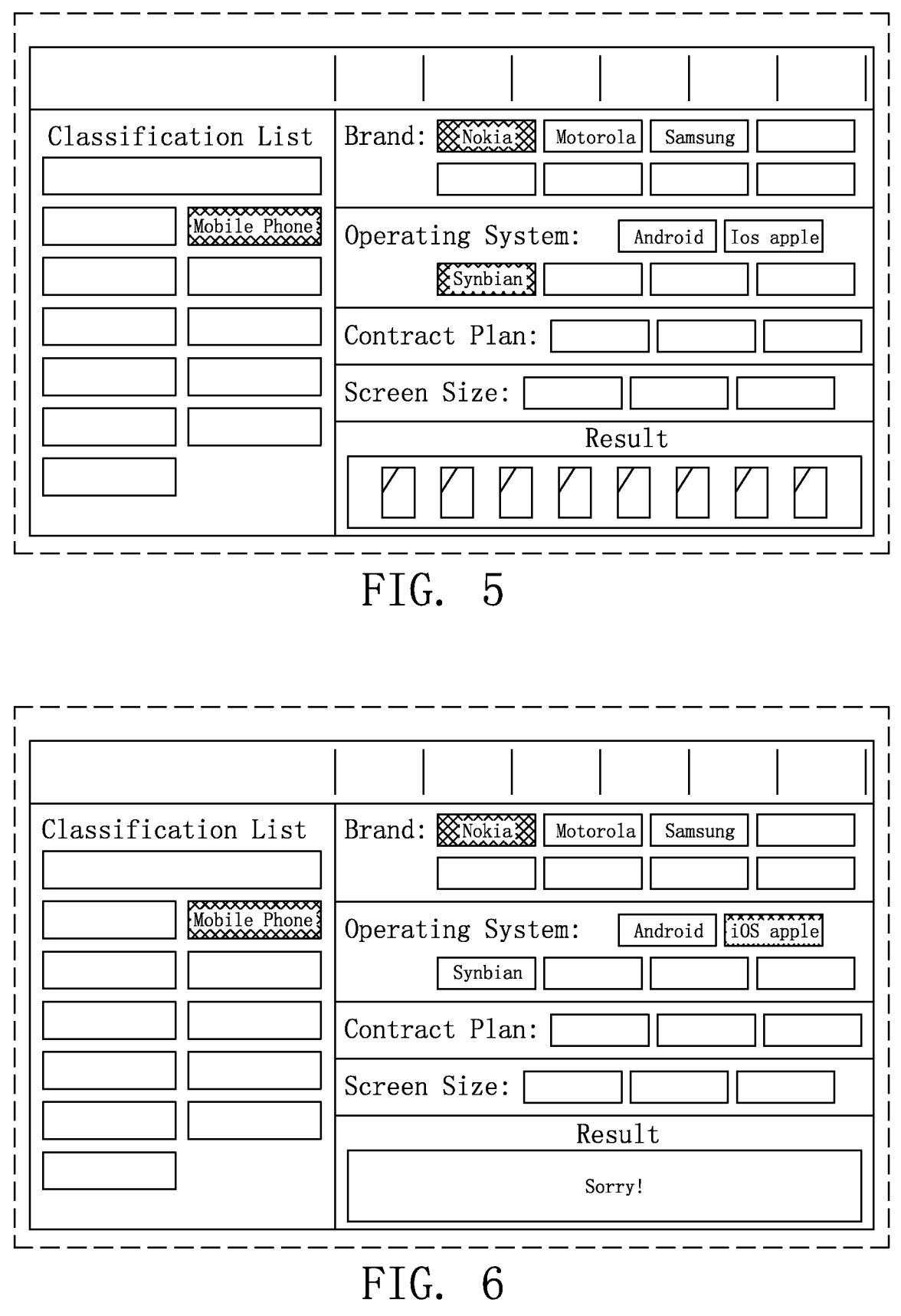

FIG. 5 is an illustration of another search process of the option two in the prior art.

FIG. 6 is an illustration of yet another search process of the option two in the prior art.

FIG. 11 is an illustration of first search process of the embodiment of the present disclosure.

FIG. 12 is an illustration of second search process of the embodiment of the present disclosure.

FIG. 13 is an illustration of third search process of the embodiment of the present disclosure.

FIG. 14 is an illustration of fourth search process of the embodiment of the present disclosure.

DETAILED DESCRIPTION OF PREFERRED EMBODIMENTS

Various embodiments of the disclosure are discussed in detail below. While specific implementations are discussed, it should be understood that this is done for illustration purposes only. A person skilled in the art will recognize that other components and configurations may be used without parting from the spirit and scope of the disclosure.

The method for searching of the present disclosure may be applied in a server.

Figure 7:
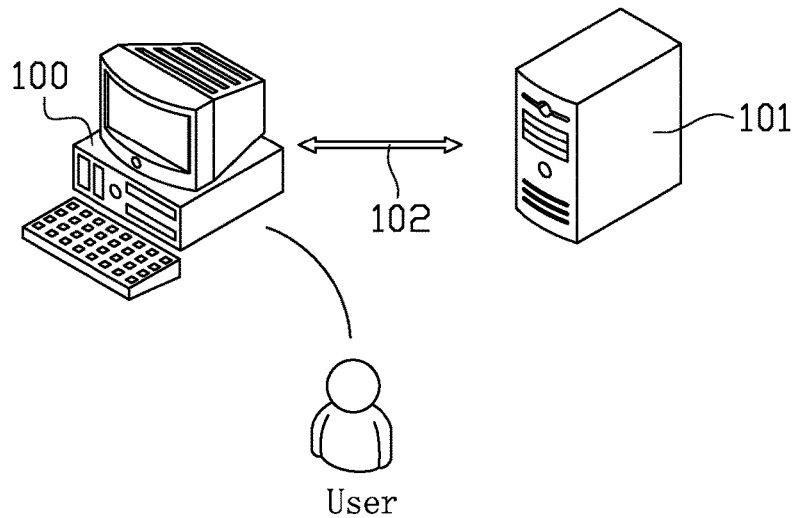
FIG. 7 illustrates a runtime environment according to various embodiments of the present disclosure.

FIG. 7 illustrates a runtime environment according to various embodiments of the present disclosure. The exemplary environment may include a client 100, a server 101 and a communication network 102. The server 101 and the client 100 may be coupled through the communication network 102 for information exchange, such as sending/receiving identification information, sending/receiving data files such as splash screen images, etc. Although only one client 100 and one server 101 are shown in the environment, any number of terminals or servers may be included, and other devices may also be included.

The communication network 102 may include any appropriate type of communication network for providing network connections to the server 101 and client 100 or among multiple servers or clients. For example, communication network 102 may include the Internet or other types of computer networks or telecommunication networks, either wired or wireless. In a certain embodiment, the disclosed methods and apparatus may be implemented, for example, in a wireless network that includes at least one client.

In some cases, the client 100 may refer to any appropriate user terminal with certain computing capabilities, such as a personal computer (PC), a work station computer, a server computer, a hand-held computing device (tablet), a smart phone or mobile phone, or any other user-side computing device. In various embodiments, the client 100 may include a network access device. The client 100 can be stationary or mobile.

A server 101, as used herein, may refer to one or more server computers configured to provide certain server functionalities, such as database management and search engines. A server 101 may also include one or more processors to execute computer programs in parallel.

An exemplary computing system for the server 101 and/or the client 100 may include a processor, a storage, a monitor, a communication module, a database, peripherals, and one or more bus to couple the devices together. Certain devices may be omitted and other devices may be included.

The processor may include any appropriate processor or processors. Further, processor can include multiple cores for multi-thread or parallel processing. Storage may include memory modules, such as ROM, RAM, and flash memory modules, and mass storages, such as CD-ROM, U-disk, removable hard disk, etc. Storage may store computer programs for implementing various processes, when executed by processor.

Further, the monitor may include display devices for displaying certain user interface contents such as splash screens. Peripherals may include I/O devices such as keyboard and mouse, and communication module may include network devices for establishing connections through the communication network. Database may include one or more databases for storing certain data and for performing certain operations on the stored data, such as database management, data extraction/analysis.

In the present disclosure, the server 101 may include a default database. The default database stores object information including names and pictures of the objects, property values of objects, the property items of the property values belonging to. Each object belonging to a property item. The objects may refer to the goods. The method and the device of the present disclosure is configured to search corresponding object information in the default database according to the search condition input or selected by users, and return the object information to users.

Figure 8:
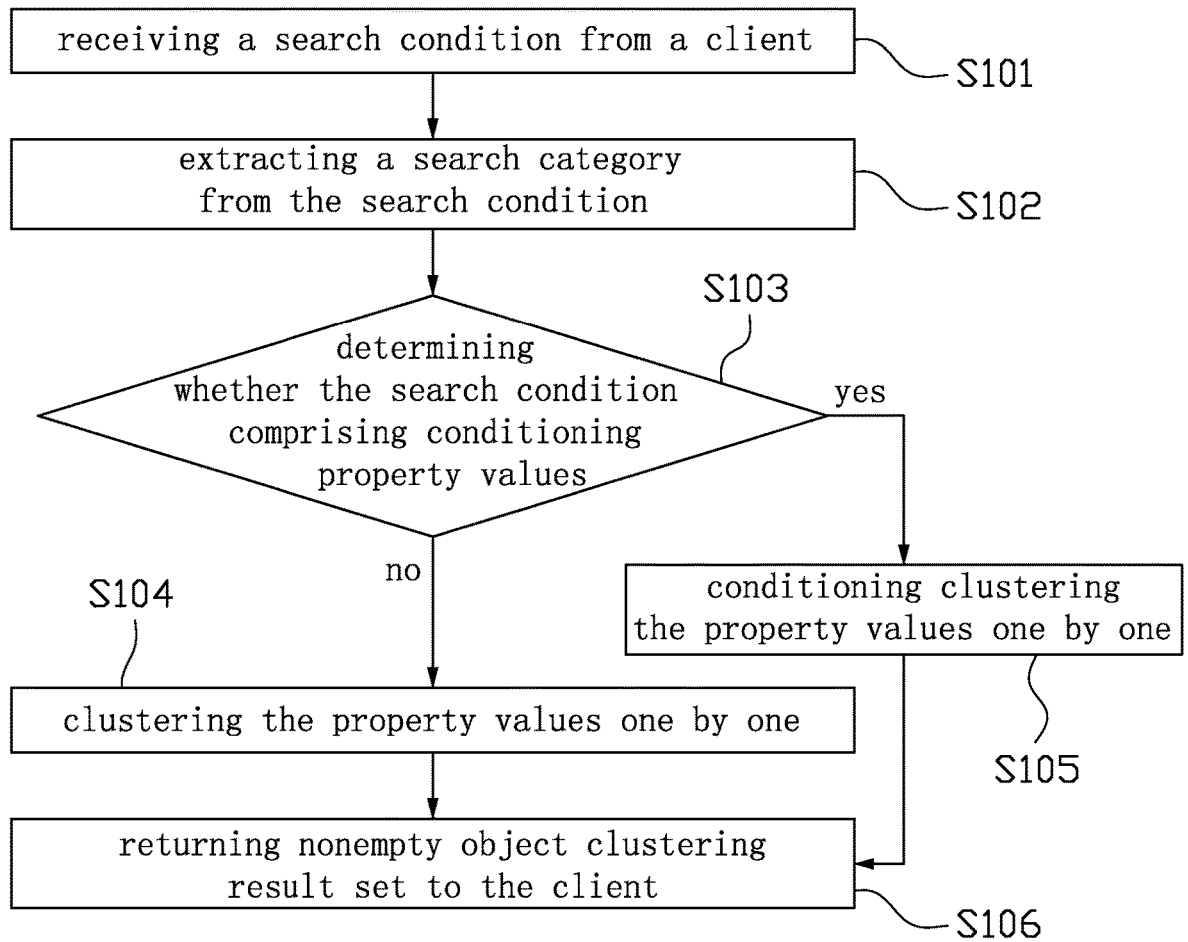
FIG. 8 is a flow chart of a searching method of one embodiment of the present disclosure.

Please refer to FIG. 8, one searching method in the present disclosure includes the following steps:

In Step 101, the searching device receives a search condition sent from a client.

When users browse object information, the search engine will provide object information such as object category, property value, etc. for users filtering. Users may also input keywords directly. These keywords, chosen object category or property value and users" information (gender, age, or region etc.) may constitute a search condition.

In Step 102, the searching device extracts search category from the search condition.

In the present disclosure, the search category may refer to information indicating object category such as "coat", "overcoat", "notebook" etc, which necessarily included in the search category.

In Step 103, the searching device determines whether there are conditioning property values selected by users in the search condition, if not, go to Step 104, otherwise go to Step 105.

In the present disclosure, the conditioning property value may refer to the word indicating object characteristic chosen by users while searching the object by means of the search list shown on the web site, such as "red", "business casual" etc. Each conditioning property value at least belongs to one property item. For instance, "red" belongs to "color", and "business casual" belongs to "style".

In Step 104, the property values are clustered one by one. The Step 104 includes obtaining the object clustering result set corresponding to each property value in the default database by using the search categories as prerequisite clustering condition, and executing Step 106.

The object clustering result set corresponding to each property value may contain a plurality of object information, or be an empty set. The object of the object clustering result set belongs to the search category, and includes corresponding property value. The empty set means there being no object in the default database neither belonging to the search category nor containing the corresponding property value.

In Step 105, the property values are conditioning clustered one by one. The conditioning clustering may include obtaining the object clustering result set corresponding to each property value in the default database by using the search categories and all conditioning property values whose property value and the property value to be clustered belong to different property items as prerequisite clustering condition, and executing Step 106.

The object clustering result set obtained in this step may contain a plurality of object information, or may be an empty set. The object of the object clustering result set may belong to the search category, and include corresponding property value and all conditioning property values whose property value and the corresponding property value belong to different property items. The empty set means there being no object in the default database, neither belonging to the search category nor containing these property values.

In Step 106, if the object clustering result set is not an empty set (nonempty object clustering result set), the searching device returns object clustering result set to the client.

After having received the object clustering result set, the client may render corresponding property value on the web page. For instance, an object cluster result set corresponding to some property value contains 10 goods' information, thus the number of the goods is rendered behind the corresponding property value directly. Users will know how many goods correspond to each property value via the searching. When users click the property value link, the pictures of the corresponding goods may be displayed on the web page directly. Furthermore, because each property value meeting the search condition is clustered, there is no need to withdraw the property value links not being clicked, users may switch the property value directly by a click, and the search result will not be empty, thus the search efficiency is improved.

Figure 9:
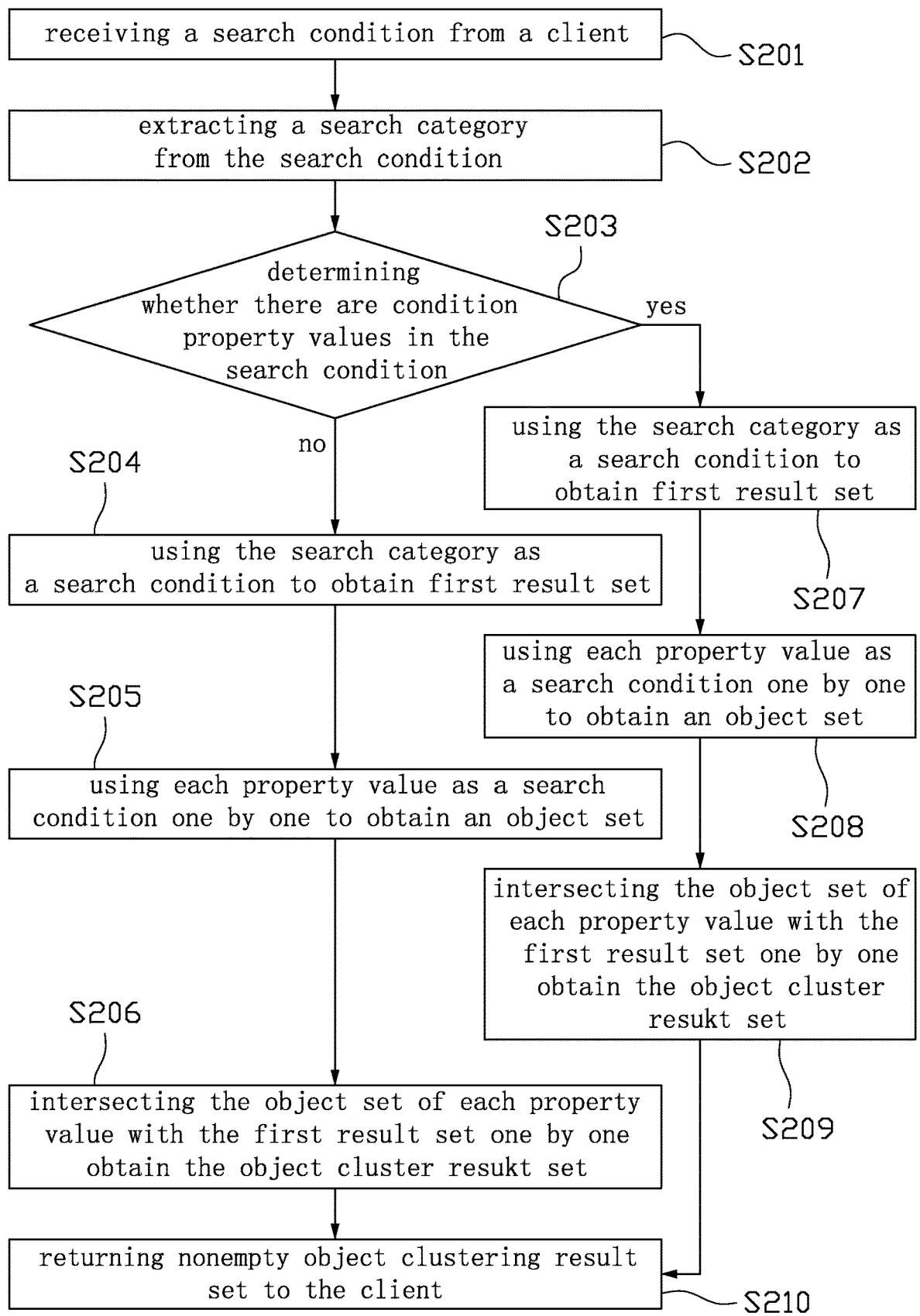
FIG. 9 is a flow chart of a searching method of another embodiment of the present disclosure.

Referring to FIG. 9, another searching method in the present disclosure includes the following steps:

In Step 201, the searching device receives a search condition sent from a client.

In Step 202, the searching device extracts search category from the search condition.

In Step 203, the searching device determines whether there are conditioning property values selected by users in the search condition, if not, go to Step 204, otherwise go to Step 207.

In Step 204, the searching device searches the default database by using the search category as a search condition to obtain first result sets of all objects belonging to the search category.

In Step 205, the searching device searches the default database by using each property value as a search condition one by one to obtain an object set corresponding to each property value.

In Step 206, the searching device intersects the object set of each property value with the first result set one by one to obtain the object cluster result set corresponding to each property value, and executes Step 210.

In Step 207, the searching device searches the default database by using the search category as a search condition to obtain first result sets of all objects belonging to the search category.

In Step 208, the searching device searches the default database by using each property value as search condition one by one to obtain an object set corresponding to each property value.

In Step 209, the searching device intersects the object set corresponding to each property value with the first result set, the object sets of all conditioning property value whose property value and the property value to be clustered belong to different property items one by one to obtain the object cluster result set corresponding to each property value, and executes Step 210.

In Step 210, if the object clustering result set is not an empty set, the searching device returns the object clustering result set to the client.

For example, assuming that after users input the search category, the search list on the web page includes:

| A: | A1 | A2 | A3 |    |
|----|----|----|----|----|
| B: | B1 | B2 | B3 | B4 |
| C: | C1 | C2 | C3 |    |

Wherein A, B, and C are property items, A1, A2, and A3 are property values belonging to A. B1, B2, and B3 are property values belonging to B. C1, C2, and C3 are property values belonging to C.

If users do not select any property value as filter, the calculation process of the present embodiment is as follows:

1. Searching, by using the search category as a search condition, and obtaining a first result set X1. The first result set X1 includes all objects belonging to the search category.

2. Searching, by using each property value (A1, A2, A3, B1, . . . , C2, C3) as a search condition one by one, and obtaining an object set Y1, Y2, . . . , Y10 correspondingly, wherein A1 corresponds to Y1, A2 corresponds to Y2, . . . , C3 corresponds to Y10. As long as Y1 contains an object, the information of the object may include the property value A1. By parity of reasoning, each object contained in Y10 may include the property value C3.

3. Intersecting the first result set X1 with the object set Y1, Y2, . . . , Y10 one by one, and obtaining an object clustering result set corresponding to each property value, wherein an object in the object clustering result corresponding to a property value certainly belongs to the search category and contains the property value.

4. Returning and presenting a nonempty object clustering result set corresponding to each property value to the client.

Scenario two, if users select the property value A2 as filter, that is the property value A2 is a conditioning property value, the calculation process of the present embodiment is as follows:

1. Searching with search category as search condition, and obtaining a first result set X1. The first result set X1 includes all objects belonging to the search category.

2. Searching with each property value (A1, A2, A3, B1, . . . , C2, C3) one by one, and obtaining object set Y1, Y2, . . . , Y10 correspondingly, wherein A1 corresponds to Y1, A2 corresponds to Y2, . . . , C3 corresponds to Y10. As long as Y1 contains an object, the information of the object certainly includes the property value A1, by parity of reasoning, each object contained in Y10 includes the property value C3.

3. Intersecting the object set Y1, Y2, . . . , Y10 corresponding to each property value with the first result set X1, the object sets of all conditioning property value whose property value and the property value to be clustered belong to different property items one by one to obtain the object cluster result set corresponding to each property value.

Wherein the conditioning property value is A2, and the conditioning property value A2 corresponds to the object set Y2. The conditioning property value A2 and the property value A1, A3 belong to the same property item A. Therefore when calculating the object clustering result set of the property value A1, A2, and A3, it is only need to intersect the property value A1, A2, A3 with the first result set X1 one by one. When calculating the object clustering result set of the property value B1, B2, . . . , C3, it is only need to intersect the property value B1, B2, . . . , C3 with the first result set X1, the object set Y2 corresponding to the conditioning property value A2 one by one. According to the correspondence between the positions, the calculation of the object clustering result set corresponding to the property value A1, A2, A3, B1, . . . , C2, C3 is as follows:

| Y1 & X1 | Y2 & X1 | Y3 & X1 |  |
|---|---|---|---|
| Y4 & X1 & Y2 | Y5 & X1 & Y2 | Y6 & X1 & Y2 | Y7 & X1 & Y2 |
| Y8 & X1 & Y2 | Y9 & X1 & Y2 | Y10 & X1 & Y2 |  |

4. Returning and presenting a nonempty object clustering result set corresponding to each property value to the client.

Scenario three, if users select the property values A2 and B3 as filters, that is, the properties A2 and B3 are conditioning property values, the calculation process of the present embodiment is as follows:

1. Searching with search category as search condition to obtain a first result set X1. The first result set X1 includes all objects belonging to the search category.

2. Searching with each property value (A1, A2, A3, B1, . . . , C2, C3) one by one, and obtaining object set Y1, Y2, . . . , Y10 correspondingly, wherein A1 corresponds to Y1, A2 corresponds to Y2, . . . , C3 corresponds to Y10. As long as Y1 contains an object, the information of the object certainly includes the property value A1, by parity of reasoning, each object contained in Y10 includes the property value C3.

3. Intersecting the object set Y1, Y2, . . . , Y10 corresponding to each property value with the first result set X1, the object sets of all conditioning property value whose property value and the property value to be clustered belong to different property items one by one to obtain the object cluster result set corresponding to each property value.

Wherein the conditioning property values are A2 and A3, and the conditioning property value A2 corresponds to the object set Y2, the conditioning property value B3 corresponds to the object set Y6. The conditioning property values A2 and the property value A1, A3 belong to the same property item A. The conditioning property values B3 and the property value B1, B2, B4 belong to the same property item B. Therefore when calculating the object clustering result set of the property value A1, A2, and A3, it is needed to intersect the property value A1, A2, A3 with the first result set X1, and the object set Y6 corresponding to the conditioning property value B3 one by one. When calculating the object clustering result set of the property value B1, B2, B3, B4, it is only needed to intersect the property value B1, B2, B3, B4 with the first result set X1, and the object set Y2 corresponding to the conditioning property value A2 one by one. When calculating the object clustering result set of the property value C1, C2, C3, it is only needed to intersect the property value C1, C2, C3 with the first result set X1, and the object set Y2, and the object set Y6 one by one. According to the correspondence between the positions, the calculation of the object clustering result set corresponding to the property value A1, A2, A3, B1, . . . , C2, C3 is as follows:

| Y1 & X1 & Y6 | Y2 & X1 & Y6 | Y3 & X1 & Y6 |  |
|---|---|---|---|
| Y4 & X1 & Y2 | Y5 & X1 & Y2 | Y6 & X1 & Y2 | Y7 & X1 & Y2 |
| Y8 & X1 & Y2 & Y6 | Y9 & X1 & Y2 & Y6 | Y10 & X1 & Y2 & Y6 |  |

Figure 10A:
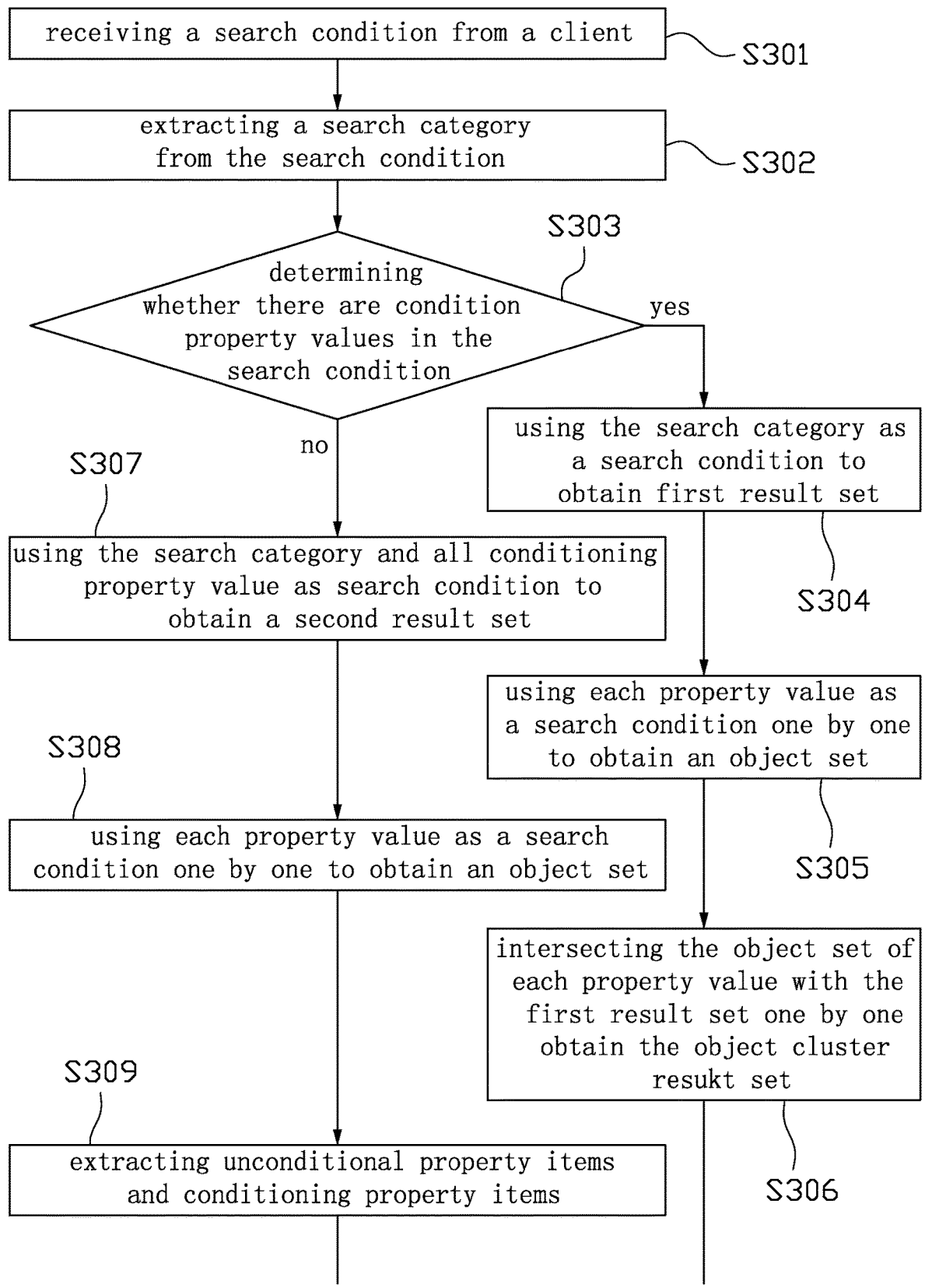
FIG. 10A and FIG. 10B show a flow chart of a searching method of yet another embodiment of the present disclosure.
Figure 10B:
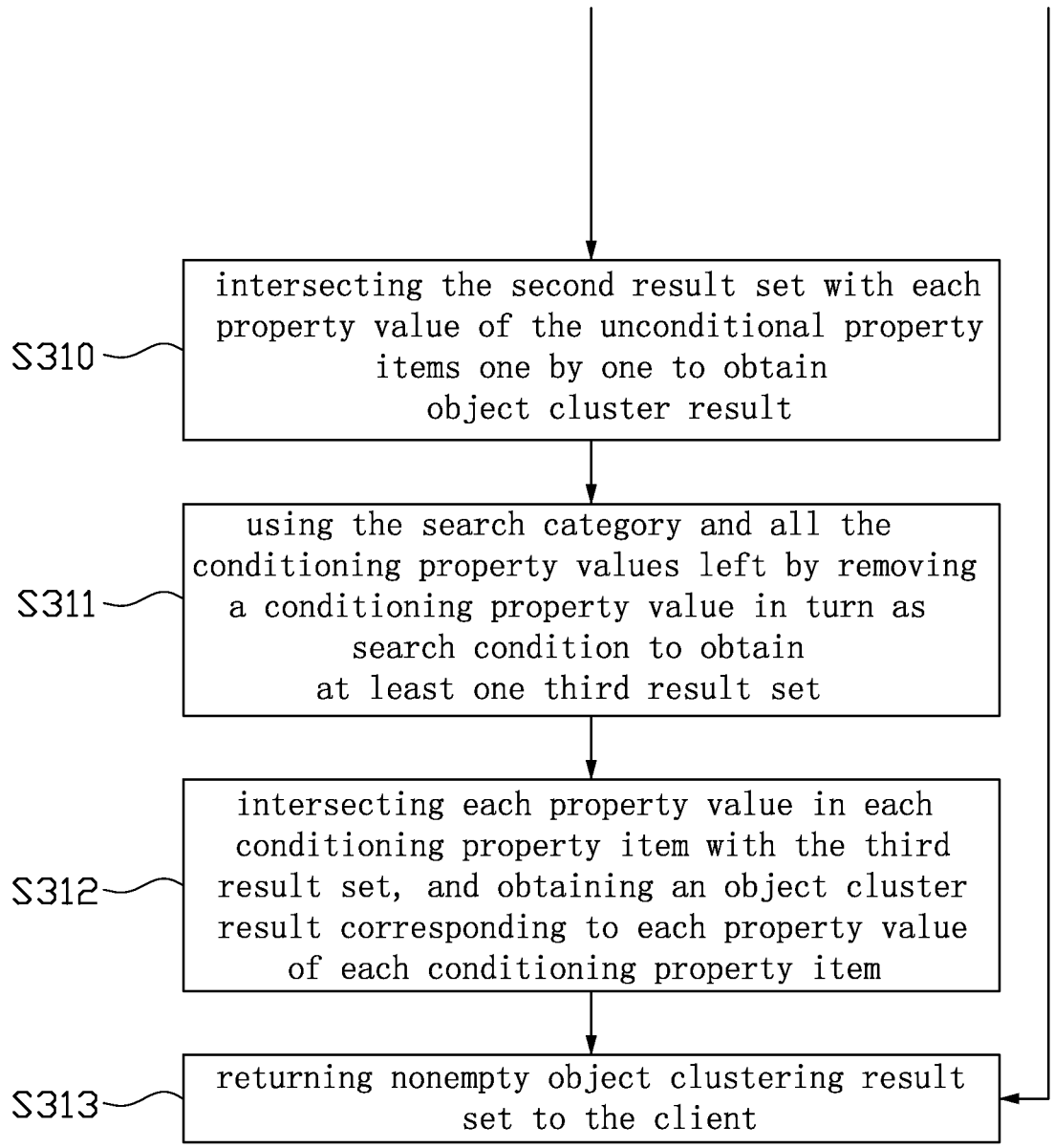
Figures 15, 16:
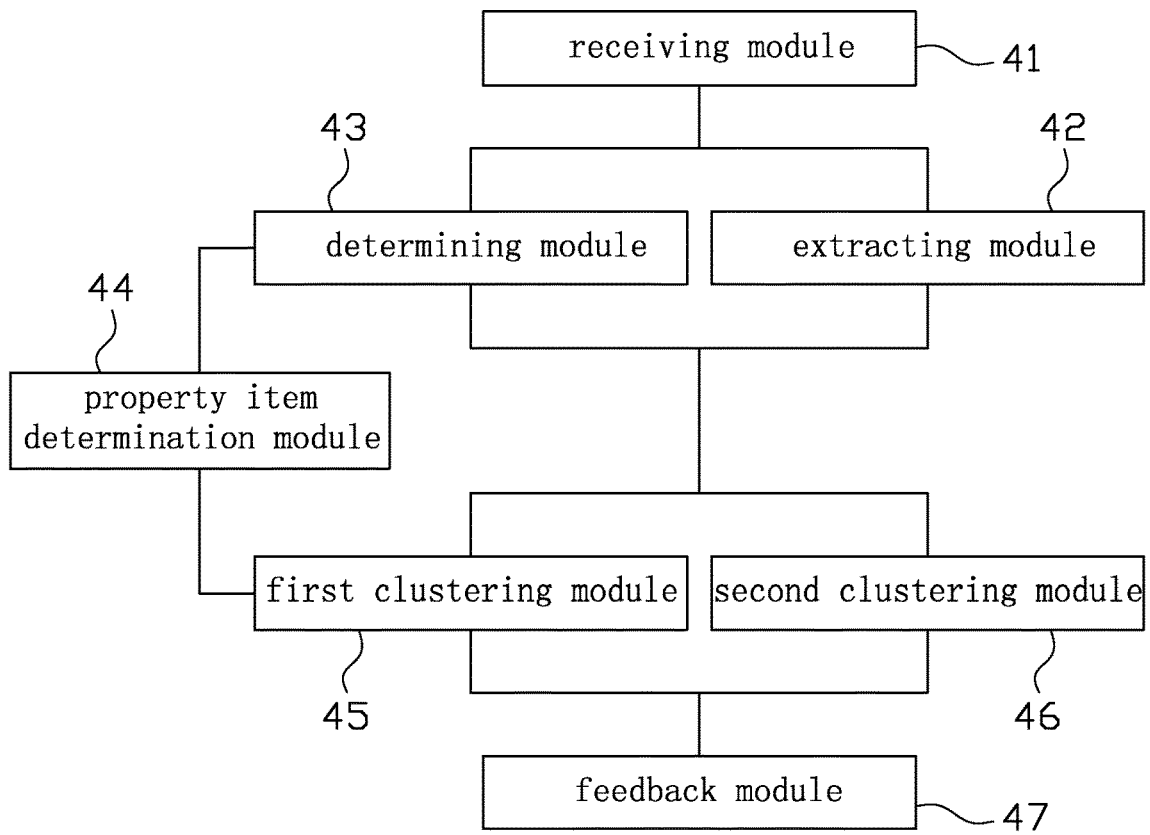
FIG. 15 is an illustration of fifth search process of the embodiment of the present disclosure.
FIG. 16 is a block diagram of a searching device of one embodiment of the present disclosure.

4. Returning and presenting a nonempty object clustering result set corresponding to each property value to the client. Referring to FIG. 10A and FIG. 10B, which show a flow chart of another searching method of the embodiment of the present disclosure, the method includes the following steps:

In Step 301, the searching device receives search condition from client.

In Step 302, the searching device extracts search category from the search condition.

In Step 303, the searching device determines whether there are conditioning property values selected by users in the search condition, if not, go to Step 304, otherwise go to Step 307.

In Step 304, the searching device searches the default database with the search category as search condition to obtain first result sets of all objects belonging to the search category.

In Step 305, the searching device searches the default database with each property value as search condition one by one to obtain an object set corresponding to each property value.

In Step 306, the searching device intersects the object set of each property value with the first result set one by one to obtain the object cluster result set corresponding to each property value, and executing Step 313.

In Step 307, the searching device searches the default database with the search category and all conditioning property value as search condition to obtain a second result set.

In Step 308, the searching device searches the default database with each property value as search condition one by one to obtain an object set corresponding to each property value.

In Step 309, the searching device extracts unconditional property items without conditioning property value and conditioning property items with conditioning property value in all of the property items of the default database.

In Step 310, the searching device intersects the second result set with each property value of the unconditional property items one by one to obtain object cluster result corresponding to each property value of the unconditional property items.

In Step 311, the searching device searches the default database with the search category and all the conditioning property values left by removing a conditioning property value in turn as search condition to obtain at least one third result set.

In Step 312, the searching device intersects each property value in each conditioning property item with the third result set obtained by removing the conditioning property value of the conditioning property item, and obtains an object cluster result corresponding to each property value of each conditioning property item, and executing the Step 313.

In Step 313, the searching device returns a nonempty object clustering result set to the client.

For example, assuming that after users input the search category, the search list on the web page includes:

| A: | A1 | A2 | A3 |    |
|----|----|----|----|----|
| B: | B1 | B2 | B3 | B4 |
| C: | C1 | C2 | C3 |    |

Wherein A, B, and C are property items, A1, A2, and A3 are property values belonging to A. B1, B2, and B3 are property values belonging to B. C1, C2, and C3 are property values belonging to C.

Scenario one, if users do not select any property value as filter, the calculation process of the present embodiment is as follows:

1. Searching with the search category as search condition, and obtaining a first result set X1. The first result set X1 includes all objects belonging to the search category.

2. Searching with each property value (A1, A2, A3, B1, . . . , C2, C3) one by one, and obtaining object set Y1, Y2, . . . , Y10 correspondingly, wherein A1 corresponds to Y1, A2 corresponds to Y2, . . . , C3 corresponds to Y10. As long as Y1 contains an object, the information of the object certainly includes the property value A1, by parity of reasoning, each object contained in Y10 includes the property value C3.

3. Intersecting the first result set X1 with the object set Y1, Y2, . . . , Y10 one by one, and obtaining an object clustering result set corresponding to each property value, wherein an object in the object clustering result corresponding to a property value certainly belongs to the search category and contains the property value.

4. Returning and presenting a nonempty object clustering result set corresponding to each property value to the client.

Scenario two, if users select the property value A2 as a filter, that is the property value A2 is a conditioning property value, the calculation process of the present embodiment is as follows:

1. Searching by using the search category and the conditioning property value A2 as search condition, thus obtaining a second result set X2. Each object of the second result set X2 both belongs to the search category and contains the property value A2.

2. Searching with each property value (A1, A2, A3, B1, . . . , C2, C3) one by one, and obtaining object set Y1, Y2, . . . , Y10 correspondingly, wherein A1 corresponds to Y1, A2 corresponds to Y2, . . . , C3 corresponds to Y10. As long as Y1 contains an object, the information of the object certainly includes the property value A1, by parity of reasoning, each object contained in Y10 includes the property value C3.

3. Extracting unconditional property items without conditioning property value and conditioning property items with conditioning property value in all of the property items. That is, the property item B and the property item C are unconditional property items, and the property item A is conditional property item.

4. Intersecting the unconditional property value item B, the object result set Y4, Y5, . . . Y10 corresponding to each property value of the unconditional property item C with the second result set X2 separately, thus obtaining the object cluster result corresponding to the property value B1, B2, . . . , C3. The object of the object cluster result of the property value B1 both belongs to the search category and contains the property value B1 and A2. The object of the object cluster result of the property value C3 both belongs to the search category and contains the property value C3 and A2.

5. Searching by using the search category as search condition (on the base of the preceding step 1, removing the conditioning property value A2) to obtain a third result set X3. The third result set X3 includes the object belonging to the search category.

6. Intersecting the object set Y1, Y2, Y3 corresponding to the property value A1, A2, A3 of the conditioning property item A with the third result set X3 separately, thus obtaining the object cluster set corresponding to the property value A1, A2, A3.

7. Returning and presenting a nonempty object clustering result set corresponding to each property value to the client.

According to the correspondence between the positions, the calculation of the object clustering result set corresponding to the property value A1, A2, A3, B1, . . . , C2, C3 is as follows:

| | | | |
|---|---|---|---|
| Y1 & X3 | Y2 & X3 | Y3 & X3 | |
| Y4 & X2 | Y5 & X2 | Y6 & X2 | Y7 & X2 |
| Y8 & X2 | Y9 & X2 | Y10 & X2 | |

Scenario three, if users select the property value A2 and B3 as filters, that is the property values A2 and B3 are conditioning property value, the calculation process of the present embodiment is as follows:

1. Searching by using the search category and the conditioning property values A2, B3 as search condition, thus obtaining a second result set X2'. Each object of the second result set X2' both belongs to the search category and contains the property value A2 and the property value B3.

2. Searching with each property value (A1, A2, A3, B1, ..., C2, C3) one by one, and obtaining object set Y1, Y2, ..., Y10 correspondingly, wherein A1 corresponds to Y1, A2 corresponds to Y2, ..., C3 corresponds to Y10. As long as Y1 contains an object, the information of the object certainly includes the property value A1, by parity of reasoning, each object contained in Y10 includes the property value C3.

3. Extracting unconditional property items without conditioning property value and conditioning property items with conditioning property value in all of the property items. That is, the property item B and the property item C are unconditional property items, and the property item A is conditional property item.

4. Intersecting the object result set Y8, Y9, Y10 corresponding to each property value of the unconditional property item C with the second result set X2' separately, thus obtaining the object cluster results corresponding to the property value C1, C2, C3. The object of the object cluster result of the property value C1 both belongs to the search category and contains the property value C1, A2, and B3 . . . . The object of the object cluster result of the property value C3 both belongs to the search category and contains the property value C3 and A2, and B3.

5. Searching by using the search category and the conditioning property value B3 as search condition (on the base of the preceding step 1, removing the conditioning property value A2) to obtain a third result set X3'. The third result set X3' includes the object both belonging to the search category and containing the property value B3.

6. Intersecting the object set Y1, Y2, Y3 corresponding to the property value A1, A2, A3 of the conditioning property item A with the third result set X3' separately, thus obtaining the object cluster set corresponding to the property value A1, A2, A3. The object of the object cluster result of the property value A1 both belongs to the search category and contains the property value A1 and B3. The object of the object cluster result of the property value A3 both belongs to the search category and contains the property value A1 and B3.

7. Searching by using the search category and the conditioning property value A2 as search condition (on the base of the preceding step 1, removing the conditioning property value B3) to obtain a third result set X'. The third result set X3' includes the object both belonging to the search category and containing the property value A2.

8. Intersecting the object set Y4, Y5, Y6, Y7 corresponding to the property value B1, B2, B3, B4 of the conditioning property item B with the third result set X3' separately, thus obtaining the object cluster set corresponding to the property value B1, B2, B3. The object of the object cluster result of the property value B1 both belongs to the search category and contains the property value B1 and A2. By parity of reasoning, the object of the object cluster result of the property value B4 both belongs to the search category and contains the property value B4 and A2.

9. Returning and presenting a nonempty object clustering result set corresponding to each property value to the client.

According to the correspondence between the positions, the calculation of the object clustering result set corresponding to the property value A1, A2, A3, B1, . . . , C2, C3 is as follows:

| | | | |
|---|---|---|---|
| Y1 & X3" | Y2 & X3" | Y3 & X3" | |
| Y4 & X3' | Y5 & X3' | Y6 & X3' | Y7 & X3' |
| Y8 & X2' | Y9 & X2' | Y10 & X2' | |

Referring to FIGS. 11-15, they each is an application illustration of the embodiment of the present disclosure.

After a user inputs keyword "coat", the page will display "man sweater", "man coat", "lady jacket" and other categories for the user to choose. When the user selects the search category of "man sweater", the page will display a search list shown as FIG. 11. The list includes five property items, which are "brand", "style", "pattern", and "design", and each property item includes a plurality of property values for user to choose.

Figures 11, 12:
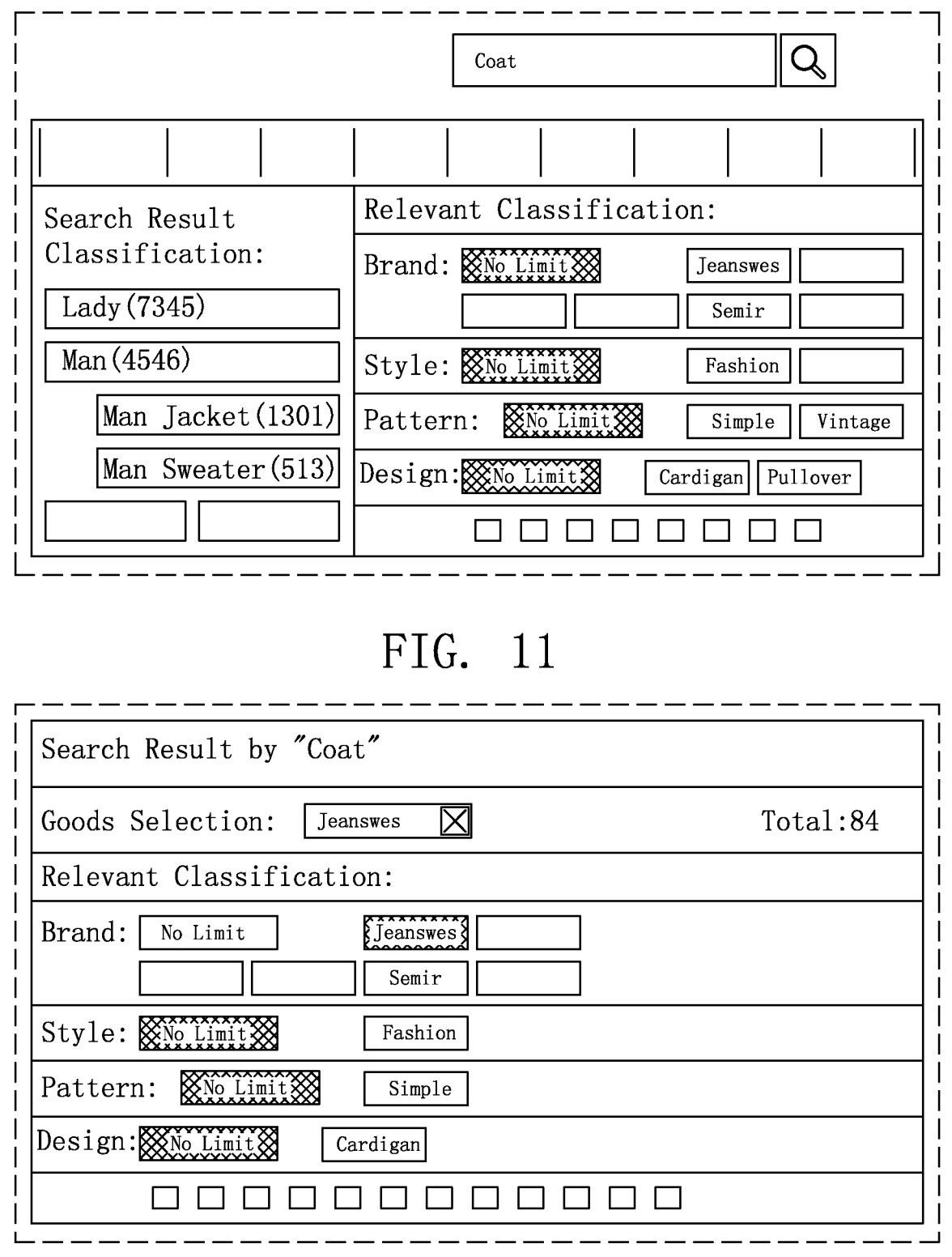

When the user selects a property value "Jeanswest" under a property item "brand", there are 84 products in total searched out by servers. As shown in FIG. 12, it can be seen that there are still other brands shown for users to select under the same property item "brand", and the property values under other property items have therefore been changed. There is only property value "fashion casual" left under the property item "style", only property value "simple" left under the property item "pattern", and only property value "cardigan" under the property item "design". It means that after searching, only the object clustering result set corresponding to "casual fashion", "simple" and "cardigan" property values under the "style", "pattern", "design" property items is nonempty set.

Figures 13, 14:
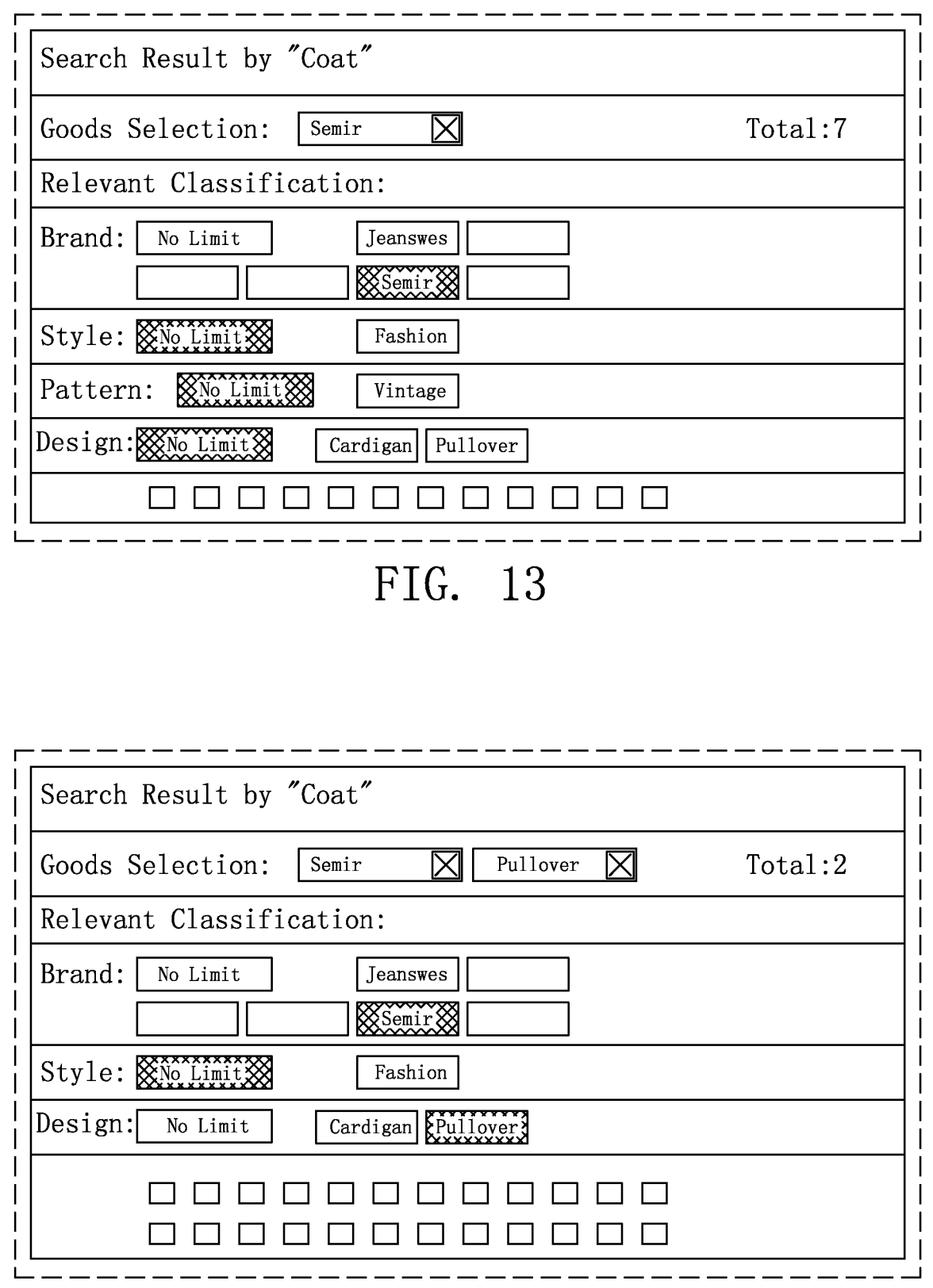

At this time, the user selects a property value "Semir" under the property item "brand", that is, the user switches from the property value of "JeansWest" to the property value of "Semir" under the same property item of "brand", as shown in FIG. 13. After searching, there are only 7 products matching the search condition, but a property value of "turtleneck" is added under the property item of "design" to choose. It means that after searching, the object clustering result set corresponding to the property value of "turtleneck" is nonempty set.

Then, when the user clicks on the property value "turtleneck" under the property item "design", there are only 2 products after searching on condition that both of the property values "Semir" under the property item "brand" and the property value "turtleneck" under the property item "design" are selected, as shown in FIG. 14. However the property value "cardigan" under the property item "design" is still available for choice. Users can switch between similar property values under the same property item to find out their interested products, which improves the search effect.

When the user switches from the property value "turtleneck" under the property item "design" to the property value "cardigan" horizontally, there are only 5 "cardigan" products under the property value "Semir", but there are other 16 property values under the property item "brand" for choice. Users can switch to different property value under the property item "brand" to browse similar products of various brands, which is convenient and swift for users to find their interested or needed products, and improves the search efficiency.

The present disclosure also provides device for searching, which can be applied on a server with default database to provide searching function for network users. The server may be a web site server, for example. The default database stores a large number of object information, including the property values of objects, the property items of the objects belonging to, and each object belonging to a property item. The object may be a specific product. The object information may include product name, product picture and so on. Please refer to FIG. 16, which is a structural diagram of a search device of one embodiment of the present disclosure. The search device includes a receiving module 41, an extracting module 42, a determining module 43, a property item determination module 44, a first clustering module 45, a second clustering module 46 and a feedback module 47. The extracting module 42 is connected to the receiving module 41. The determining module 43 is connected to the receiving module 41. The property item determination module 44 is connected to the determining module 43. The first clustering module 45 is connected to the extracting module 42, the determining module 43, and the property item determination module 44 separately. The second clustering module 46 is connected to the extracting module 42 and the determining module 43 separately. The feedback module 47 is connected to the first clustering module 45 and the second clustering module 46 separately.

The receiving module 41 is configured to receive search condition sent from a client. After receiving the search condition, the receiving module 41 sends the search condition to the extracting module 42, and the extracting module 42 will extract search categories from the search condition. At the same time, the receiving module 41 also sends the search condition to the determining module 43, and the determining module 43 will determine if there are user selected conditioning property values by users in the search condition. The conditioning property value means the property values input by users or selected according to page introduction, which is used as search condition.

If finding that there is no conditioning property value (that is only search categories is included in the search condition) in the search condition, the determining module 43 will send starting operation command to the second clustering module 46. After receiving the search categories from the receiving module 41, the second clustering module 46 does clustering operation on each property value with the search categories as prerequisite clustering condition, thus obtains the object clustering result set in the default database according to each property value. Then the second clustering module 46 sends the object clustering result set corresponding to each property value to the feedback module 47, and the feedback module 47 will return and present a nonempty object clustering result set to the client.

If finding that there are conditioning property values in the search condition, the determining module 43 will send starting operation command to the first clustering module 45. At the same time, the property item determination module 44 will obtain the property item to which each conditioning property value belongs according to the determination result of the determining module 43. After receiving the search categories from the receiving module 41, the first clustering module 45 does conditioning clustering operation on each property value according to the search categories and conditioning property value. The first clustering module 45 is configured to obtain the object clustering result set corresponding to each property value in a default database by using the search categories and all conditioning property values whose property value and the property value to be clustered belong to different property items as prerequisite clustering condition, then sends the object clustering result set corresponding to each property value to the feedback module 47, and the feedback module 47 returns the nonempty object clustering result set to the client.

Figure 17:
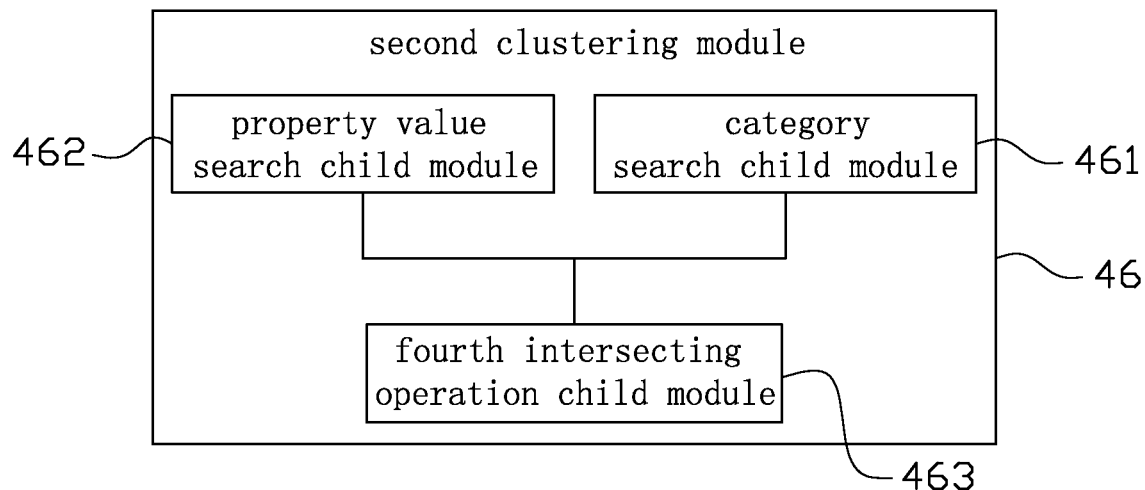
FIG. 17 is a block diagram of a second cluster module of the embodiment of the present disclosure.

Please refer to FIG. 17, which is a structural diagram of a second clustering module of the embodiment of the present disclosure. The second clustering module includes a category search child module 461, a property value search child module 462, and a fourth intersecting operation child module 463. The category search child module 461 is connected to the extracting module 42, and the fourth intersecting operation child module 463 is connected to the category search child module 461 and the property value search child module 462 separately.

The category search child module 461 is configured to search the default database with the search category as search condition, and obtain the first result set of all objects belonging to the search category. The property value search child module 462 is configured to search the default database with each property value as search condition one by one, and obtain the object set corresponding to each property value. The fourth intersecting operation child module 463 is configured to intersect the object set of each property value obtained by the property value search child module 462 with the first result set obtained by the category search child module 461 one by one, thus obtain the object cluster result set corresponding to each property value.

Figure 18:
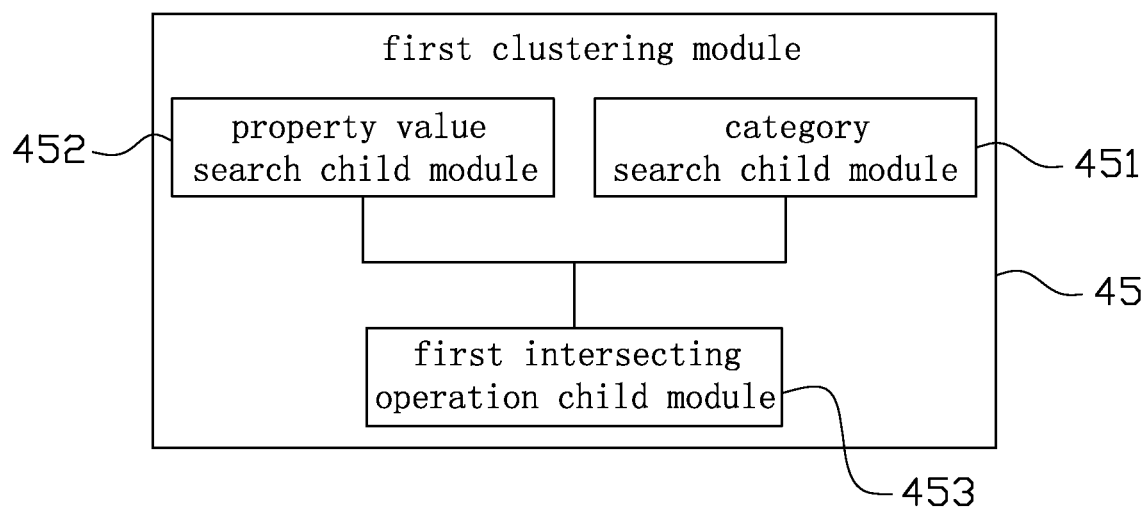
FIG. 18 is a block diagram of a first cluster module of the embodiment of the present disclosure.

Please refer to FIG. 18, which is a structural diagram of the first clustering module in the embodiment of the present disclosure. The first clustering module 45 includes a category search child module 451, a property value search child module 452, and a first intersecting operation child module 453. The category search child module 451 is connected to the extracting module 42, and the first intersecting operation child module 453 is connected to the category search child module 451, the property value search child module 452 and the property item determination module 44 separately.

The category search child module 451 is configured to search the default database with the search category as search condition, and obtain the first result set of all objects belonging to the search category. The property value search child module 452 is configured to search the default database with each property value as search condition, and obtain the object set corresponding to each property value. The category search child module 451 and the property value search child module 452 may be set individually, or may be shared with the second clustering module.

The first intersecting operation child module 453 is configured to obtain all conditioning property values whose property value does not belong to the same property item as the property value of the each conditioning property value output by the property item determination module 44 first, and then intersect the object set corresponding to each property value which is obtained by the property value search child module 452, the category search child module 451, and the object set of all conditioning property values belonging to different property item from the property value to be calculated one by one, and obtain the object clustering result set corresponding to each property value.

Figure 19:
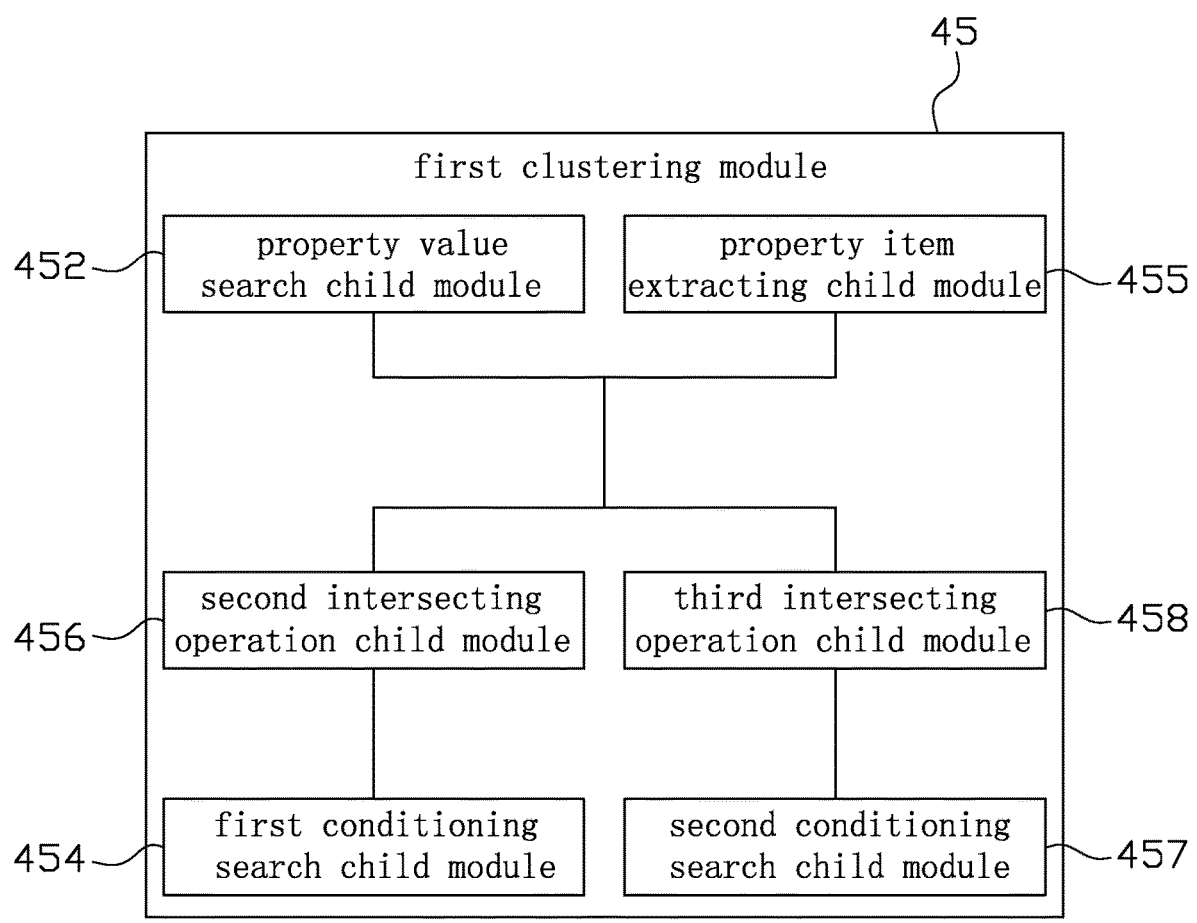
FIG. 19 is a block diagram of another first cluster module of the embodiment of the present disclosure.

Please refer to FIG. 19, which is another structural diagram of the first clustering module of the embodiment of the present disclosure. The first clustering module includes a first conditioning search child module 454, a property value search child module 452, a property item extracting child module 455, a second intersecting operation child module 456, a second conditioning search child module 457, and a third intersecting operation child module 458. The first conditioning search child module 454 is connected to the extracting module 42 and the determining module 43 separately. The property item extracting child module 455 is connected to the property item determination module 44. The second intersecting operation child module 456 is connected the first conditioning search child module 454, the property value search child module 452, and the property item extracting child module 455 separately. The second conditioning search child module 457 is connected to the extracting module 42 and the determining module 43 separately. The third intersecting operation child module 458 is connected to the second conditioning search child module 457, the property value search child module 452, and the property item extracting child module 455 separately.

The first conditioning search child unit 454 is configured to search the default database with the search category and all conditioning property values as search condition, and obtain a second result set. The property value search child module 452 is configured to search the default database with each property value as search condition one by one, and obtain the object set corresponding to each property value. The property item extracting child module 455 is configured to extracts unconditional property items without conditioning property value and conditioning property items with conditioning property value in all of the property items of the default database.

According to the unconditional property items extracted by the property item extracting child module 455, the second intersecting operation child module 456 is configured to receive the object set corresponding to each property value in all unconditional property items from the property value search child module 452, and intersect the object set corresponding to each property value in the unconditional property items with the second result set one by one, and obtain the object clustering result corresponding to each property value of the unconditional property item.

The second conditioning search child module 457 is configured to search the default database with the search category and all the conditioning property values left by removing a conditioning property value in turn as search condition, and obtain at least one third result set. For example, if the determining module 43 determines that there is only one conditioning property value in the search condition, the second conditioning search child module 457 will obtain one third result set by calculation; if the determining module 43 determines that there are two conditioning property values in the search condition, the second conditioning search child module 457 will obtain two third result sets by calculation.

According to the conditioning property items extracted by the property item extracting child module 455, the third intersecting operation child module 456 is configured to receive the object set corresponding to each property value in all conditioning property items from the property value search child module 452, and intersect each property value in each conditioning property item and the third result set obtained by removing the conditioning property value of the conditioning property item, and obtain an object cluster result corresponding to each property value of each conditioning property item.

The preceding modules may store in the storage of the server 101.

The search device provided by the present disclosure is able to cluster each property value meeting the search condition. Therefore after the search result returned by the search device is received by the client, the property value meeting the search condition is rendered on the web page for users choosing, and users may switch the property value by a click directly, and the search result will not be empty, thus the search efficiency is improved.

What's more, various devices and methods provided by the embodiments of the disclosure discussed above is done for illustration purposes only, and should not be taken as limitations of the general principles of the device for starting application in electronic apparatus provided by the embodiment of the disclosure. It will be understood that various combinations and changes in the form and details of the device and method illustrated may be made by those skilled in the art without departing from the disclosure.

Embodiments within the scope of the present disclosure may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. A "tangible" computer-readable medium expressly excludes software per se (not stored on a tangible medium) and a wireless, air interface. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that performs particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps. Program modules may also comprise any tangible computer-readable medium in connection with the various hardware computer components disclosed herein, when operating to perform a particular function based on the instructions of the program contained in the medium.

The above descriptions are only preferred embodiments of the present disclosure, and are not intended to limit the present disclosure. Any amendments, replacement and modification made to the above embodiments under the spirit and principle of the present disclosure should be included in the scope of the present disclosure.

What is claimed is:

1. A method for searching, comprising:
receiving a search condition from a client;
extracting a search category from the search condition, and generating a search list on a web page of the client according to the search category, wherein the search list comprising a plurality of property items corresponding to the search category, and each of the plurality of property items comprising a plurality of property values selectable by a user as conditioning property values;
determining whether an updated search condition is received, the updated search condition comprising any of the conditioning property values included in the search list and selected by the user;
based on a determination that the updated search condition comprising at least one of the conditioning property values is received, performing:
(a) conditioning clustering the property values one by one, to obtain a plurality of object clustering result sets, wherein the conditioning clustering comprises obtaining an object clustering result set corresponding to each property value by using, as a prerequisite clustering condition, the search category, the at least one of the conditioning property values included in the updated search condition, and property values that belong to property items the same as or different from that to which the at least one of the conditioning property values belongs; and
(b) returning nonempty ones of object clustering result sets to an updated search list on the web page of the client,
wherein the updated search list includes property values that belong to the same property item of the at least one of the conditioning property values so as to allow the user to switch between different property values in the same property item,
wherein, when a switch between the different property values in the same property item is performed, performing (a) and (b) with respect to a switched property value,
wherein a first property value of which the object clustering result is empty disappears from the web page of the client displaying the updated search list such that a user selection cannot be made with respect to the first property value in the updated search result, and
wherein the conditioning clustering the property values one by one comprises:
searching a default database by using the search category as the search condition to obtain a first result set of all objects belonging to the search category;
searching the default database by using each property value as the search condition one by one to obtain an object set corresponding to each property value;
for a second property value that belongs to a property item that is the same as that to which the at least one of the conditioning property values belongs, intersecting, one by one, the object set corresponding to each property value with (i) the first result set, with (ii) an object set corresponding to the second property value, to obtain an object clustering result set corresponding to the second property value; and
for a third property value that belongs to a property item that is different from that to which the at least one of the conditioning property values belongs, intersecting, one by one, the object set corresponding to each property value with (i) the first result set, with (ii) the object set corresponding to the at least one of the conditioning property values, and further with (iii) an object set corresponding to the third property value, to obtain an object clustering result set corresponding to the third property value.

2. The method as claimed in claim 1, wherein a second property value of which the object clustering result is nonempty is selected in the updated search list, the web page of the client displays a number of objects included in the object clustering result corresponding to the second property value.

3. The method as claimed in claim 1, wherein a second property value of which the object clustering result is nonempty is selected in the updated search list, the web page of the client displays a number of objects included in the object clustering result corresponding to the second property value, and
wherein the number of objects included in the object clustering result corresponding to the second property value corresponds to the number of objects according to a result of the intersecting the object set corresponding to the second property value.

4. A device for searching, the device comprising:
at least one memory configured to store program code; and
at least one processor configured to access said memory, read said program code, and operate as instructed by said program code, said program code including:
receiving code configured to cause at least one of the at least one processor to receive a search condition sent from a client;
extracting code configured to cause at least one of the at least one processor to extract a search category from the search condition, and generating a search list on a web page of the client according to the search category, wherein the search list comprising a plurality of property items corresponding to the search category, and each of the plurality of property items comprising a plurality of property values selectable by a user as conditioning property values;
determining code configured to cause at least one of the at least one processor to determine whether an updated search condition is received, the updated search condition comprising any of the conditioning property values included in the search list and selected by the user;
code configured to cause at least one of the at least one processor to, based on a determination that the updated search condition comprising at least one of the conditioning property values is received, perform:
(a) conditioning clustering, the conditioning clustering comprises obtaining an object clustering result set corresponding to each property value by using, as a prerequisite clustering condition, the search category, the at least one of the conditioning property values included in the updated search condition, and property values that belong to property items the same as or different from that to which the at least one of the conditioning property values belongs; and
(b) returning nonempty ones of object clustering result sets to an updated search list on the web page of the client,
wherein the updated search list includes property values that belong to the same property item of the at least one of the conditioning property values so as to allow the user to switch between different property values in the same property item, wherein, when a switch between the different property values in the same property item is performed, performing (a) and (b) with respect to a switched property value, wherein a first property value of which the object clustering result is empty disappears from the web page of the client displaying the updated search list such that a user selection cannot be made with respect to the first property value in the updated search result, wherein the conditioning clustering comprises:
  searching a default database by using the search category as the search condition to obtain a first result set of all objects belonging to the search category;
  searching the default database by using each property value as the search condition one by one to obtain an object set corresponding to each property value;
  for a second property value that belongs to a property item that is the same as that to which the at least one of the conditioning property values belongs, intersecting, one by one, the object set corresponding to each property value with (i) the first result set, with (ii) an object set corresponding to the second property value, to obtain an object clustering result set corresponding to the second property value; and
  for a third property value that belongs to a property item that is different from that to which the at least one of the conditioning property values belongs, intersecting, one by one, the object set corresponding to each property value with (i) the first result set, with (ii) the object set corresponding to the at least one of the conditioning property values, and further with (iii) an object set corresponding to the third property value, to obtain an object clustering result set corresponding to the third property value.

5. A non-transitory computer-readable storage storing instructions for search in a server, the instructions, when executed by one or more processors, cause the one or more processors to perform:
  receiving a search condition from a client;
  extracting a search category from the search condition, and generating a search list on a web page of the client according to the search category, wherein the search list comprising a plurality of property items corresponding to the search category, and each of the plurality of property items comprising a plurality of property values selectable by a user as conditioning property values;
  determining whether an updated search condition is received, the updated search condition comprising any of the conditioning property values included in the search list and selected by the user;
  based on a determination that the updated search condition comprising at least one of the conditioning property values is received, performing:

(a) conditioning clustering the property values one by one, to obtain a plurality of object clustering result sets, wherein the conditioning clustering comprises obtaining an object clustering result set corresponding to each property value by using, as a prerequisite clustering condition, the search category, the at least one of the conditioning property values included in the updated search condition, and property values that belong to property items the same as or different from that to which the at least one of the conditioning property values belongs; and
  (b) returning nonempty ones of object clustering result sets to an updated search list on the web page of the client, wherein the updated search list includes property values that belong to the same property item of the at least one of the conditioning property values so as to allow the user to switch between different property values in the same property item, wherein, when a switch between the different property values in the same property item is performed, performing (a) and (b) with respect to a switched property value, wherein a first property value of which the object clustering result is empty disappears from the web page of the client displaying the updated search list such that a user selection cannot be made with respect to the first property value in the updated search result, wherein the conditioning clustering the property values one by one comprises:
  searching a default database by using the search category as the search condition to obtain a first result set of all objects belonging to the search category;
  searching the default database by using each property value as the search condition one by one to obtain an object set corresponding to each property value;
  for a second property value that belongs to a property item that is the same as that to which the at least one of the conditioning property values belongs, intersecting, one by one, the object set corresponding to each property value with (i) the first result set, with (ii) an object set corresponding to the second property value, to obtain an object clustering result set corresponding to the second property value; and
  for a third property value that belongs to a property item that is different from that to which the at least one of the conditioning property values belongs, intersecting, one by one, the object set corresponding to each property value with (i) the first result set, with (ii) the object set corresponding to the at least one of the conditioning property values, and further with (iii) an object set corresponding to the third property value, to obtain an object clustering result set corresponding to the third property value.

* * * * *